US007201156B1

(12) United States Patent
Wait

(10) Patent No.: US 7,201,156 B1
(45) Date of Patent: Apr. 10, 2007

(54) THERMAL TRANSFER INTERNAL COMBUSTION ENGINE

(76) Inventor: Irving S. Wait, 4930 E. Highway 50, Seymour, IN (US) 47274

( * ) Notice: Subject to any disclaimer, the term of this patent is extended or adjusted under 35 U.S.C. 154(b) by 0 days.

(21) Appl. No.: 11/135,887

(22) Filed: May 24, 2005

(51) Int. Cl.
F02B 33/22 (2006.01)
(52) U.S. Cl. ..................... 123/556; 123/70 R
(58) Field of Classification Search .............. 123/556, 123/70 R
See application file for complete search history.

(56) References Cited

U.S. PATENT DOCUMENTS

| | | | |
|---|---|---|---|
| 2,594,845 A * | 4/1952 | Baumann ..................... 60/609 |
| 3,623,463 A | 11/1971 | De Vries |
| 3,872,839 A * | 3/1975 | Russell et al. .............. 123/220 |
| 3,963,012 A | 6/1976 | Harned |
| 4,022,172 A | 5/1977 | Fingeroot |
| 4,040,400 A | 8/1977 | Kiener |
| 4,365,606 A * | 12/1982 | Endo ........................ 123/556 |
| 4,608,828 A | 9/1986 | Mikota |
| 5,205,246 A | 4/1993 | McWhorter |
| 5,265,564 A * | 11/1993 | Dullaway ................. 123/70 R |
| 5,499,605 A * | 3/1996 | Thring ..................... 123/70 R |
| 5,857,436 A * | 1/1999 | Chen ....................... 123/70 R |
| 6,318,310 B1* | 11/2001 | Clarke ..................... 123/70 R |
| 6,553,977 B2* | 4/2003 | Schmitz .................... 123/561 |
| 6,606,970 B2* | 8/2003 | Patton ...................... 123/25 C |
| 6,789,514 B2 | 9/2004 | Suh et al. |
| 7,004,115 B2* | 2/2006 | Patton ...................... 123/25 C |

OTHER PUBLICATIONS

Proell, Wayne Arthur; *The Thermodynamic Exploration for High Efficiency Internal Combustion Engines, Book 2*; ™ 1993; Cloud Hill Scientific Developments, Las, Vegas, New Mexico; pp. 30-32,192-193, 204-205, 209, 211-213, 473-474.

* cited by examiner

Primary Examiner—Stephen K. Cronin
Assistant Examiner—Jason Benton
(74) Attorney, Agent, or Firm—P. Derek Pressley

(57) ABSTRACT

A thermal transfer internal combustion engine with an air transfer cylinder located between a pair of power cylinders. The transfer cylinder has an intake valve and two transfer valves alternately feeding the two power cylinders. The power cylinders each contain a mono valve used for both intake and exhaust. Counter-flow manifolds connect the mono valves of the power cylinders to the transfer valves of the transfer cylinder. A regenerator with catalytic converter properties is located in each counter-flow manifold. The regenerator is heated by exhaust gases exiting the power cylinders, prior to exiting the engine through exhaust dump valves. Uncompressed intake air is pushed from the transfer cylinder through the regenerator where it is heated and delivered to the power cylinder for conventional processing. The heat recovery system provides high compression temperatures at low compression ratios, reducing engine fuel consumption.

18 Claims, 7 Drawing Sheets

COMPRESSION TEMPERATURES

| Cr | 800°R | 900°R | Recovery Heat 1000°R | 1100°R | 1200°R | Based on 4,000°R Combustion Temperature |
|----|-------|-------|-------|-------|-------|---|
| 4 | 1353°R (576) BTU | 1502°R (547) BTU | 1652°R (518) BTU | 1799°R (488) BTU | 1946°R (458) BTU | |
| 5 | 1461°R (555) BTU | 1623°R (524) BTU | 1782°R (492) BTU | 1939°R (459) BTU | | |
| 6 | 1557°R (537) BTU | 1728°R (502) BTU | 1894°R (469) BTU | 2058°R (434) BTU | 2200°R (400) BTU | |
| 7 | 1642°R (520) BTU | 1819°R (484) BTU | 1903°R (467) BTU | 2165°R (412) BTU | | |
| 8 | 1719°R (504) BTU | 1897°R (468) BTU | 2082°R (429) BTU | 2261°R (391) BTU | 2434°R (354) BTU | |
| 9 | 1789°R (490) BTU | 1978°R (451) BTU | 2163°R (412) BTU | 2313°R (380) BTU | 2526°R (334) BTU | |

( ) BTU'S FUEL DRAW PER 1 POUND AIR

FIG. 3

THERMAL TRANSFER INTERNAL COMBUSTION ENGINE

BACKGROUND OF INVENTION

This invention relates to internal combustion engines, and more specifically to internal combustion engines utilizing heat recovery systems to increase engine efficiency.

In a review of internal combustion engines, the gas-fueled Otto engine and the diesel-fueled diesel engine appear to be the only types of engines that have survived the test of time and remain in widespread use.

The diesel engine has a greater thermal efficiency than the Otto engine due to the higher compression ratios of the diesel engines. High compression ratios are employed to achieve high temperatures from the compression.

It is common knowledge that an engine possessing an expansion ratio greater than the compression ratio has a greater work output than a comparable engine where the compression ratio and expansion ratio are the same. In the Otto engine all cylinders have the same swept volume negating the option of increasing the expansion ratio.

It is further recognized that internal combustion engines have low thermal efficiencies due to high heat losses, primarily through the exhaust systems. Other concerns over the internal combustion engine are the desire to reduce harmful exhaust emission and to reduce fuel consumption of engines to protect our problematic crude oil position.

The oil supply for our fuels is not limitless. Once the oil supply is gone, it is gone for good. The worldwide demand for oil continues to increase with no letup in sight. It becomes imperative that we develop more energy efficient devices, including the internal combustion engine. The introduction of the hybrid vehicle system is industry recognition of the need to conserve fuel.

Internal combustion engines are, in reality, heat engines with fuel being the source of the heat. Thermal efficiencies of internal combustion engines are low because much of the heat contained in the fuel ends up as waste heat, either exhaust or coolant losses. Engine manufacturers have made no effort to recover and recycle any of this waste heat.

It is generally accepted by the industry that high compression ratios are the path to improved engine efficiencies. Fuels were developed using high octane and special additives to help retard fuel ignition so that higher compression ratios could be used. Most of the present gas-fueled engines inject the fuel into the intake air supply before compression. High compression temperatures may cause premature air fuel ignition, thus the present limit on compression ratios and compression temperatures.

SUMMARY OF THE INVENTION

According to one aspect of the present invention a thermal transfer internal combustion engine has a transfer cylinder with a transfer piston reciprocating therein and an intake valve. The transfer piston draws intake air into the transfer cylinder through the intake valve as the transfer piston moves downwardly within the transfer cylinder and pushes the intake air from the transfer cylinder through a transfer valve into a manifold in fluid communication with the transfer cylinder as the transfer piston moves upwardly in the transfer cylinder. A power cylinder with a power piston reciprocating therein is connected in fluid communication with the manifold. The power piston draws the intake air from the manifold into the power cylinder as the power piston moves downwardly. A mono valve positioned within the power cylinder is heated by exhaust gases exiting the power cylinder and imparts heat to intake air entering the power cylinder. A regenerator within the manifold between the transfer valve and the mono valve absorbs heat from the exhaust gas entering the manifold and imparts heat to the intake air entering the power cylinder. An exhaust valve is positioned within the manifold between the regenerator and the transfer valve. Exhaust gases pushed by the power piston from the power cylinder through the mono valve, contacts the regenerator, and exits through the exhaust valve.

According to another aspect of the present invention a thermal transfer internal combustion engine has a pair of four stroke cycle power cylinders and a transfer cylinder having a transfer piston reciprocating therein delivering intake air during each upward stroke. A manifold alternately delivers intake air from the transfer cylinder to the power cylinders. A regenerator within the manifold absorbs heat from exhaust gas exiting the power cylinder and imparts heat to the intake air prior to entering the power cylinders.

According to a further aspect of the present invention a thermal transfer internal combustion engine has a power cylinder with a power piston reciprocating therein in fluid communication with a transfer cylinder. The transfer cylinder has a transfer piston reciprocating out of phase with the power piston. An intake valve in the transfer cylinder intakes intake air into the transfer cylinder and bleeds off excess intake air from the transfer cylinder. A transfer valve in the transfer cylinder controls volume of intake air delivered to the power cylinder. A regenerator positioned between the power cylinder and the transfer cylinder absorbs heat from exhaust gas exiting the power cylinder and imparts heat to intake air entering the power cylinder.

BRIEF DESCRIPTION OF THE DRAWINGS

FIG. 3 is a table of compression temperatures and fuel draws at different heat recovery temperatures and different compression ratios.

DETAILED DESCRIPTION OF THE PREFERRED EMBODIMENT

Figure 1:
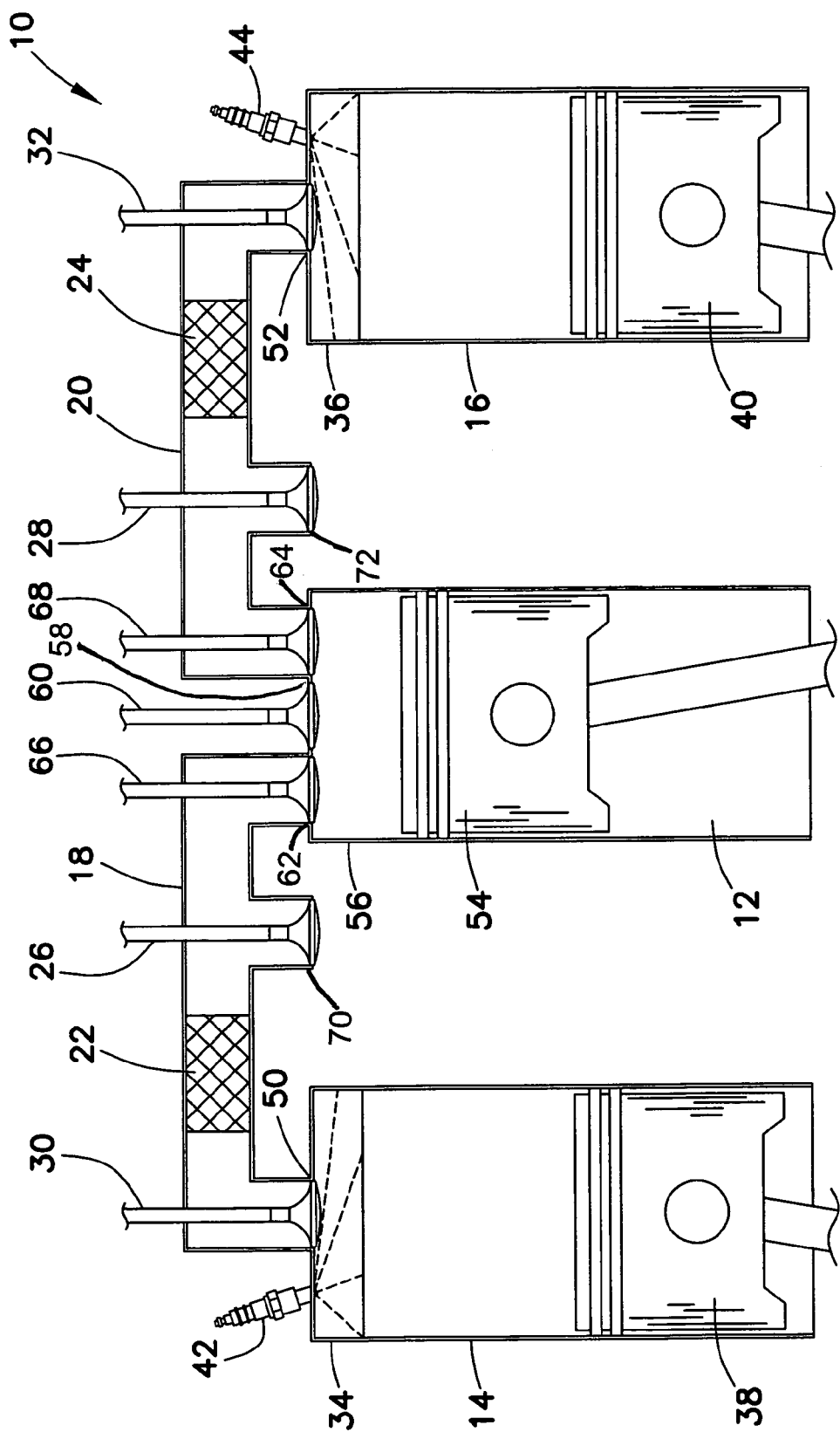
FIG. 1 is a sectional view of a thermal transfer engine of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

The thermal transfer internal combustion engine 10 of the present invention, shown in FIG. 1, is an internal combustion engine of typical four-stroke design that utilizes a heat recovery system to increase the thermal efficiency of the engine 10 by recovering the waste heat of the exhaust system. The heat recovery system generally comprises a transfer cylinder 12 positioned between each pair of power cylinders 14, 16, counter-flow manifolds 18, 20 connecting the transfer cylinder 12 to the power cylinders 14, 16, regenerators 22, 24 and exhaust dump valves 26, 28 positioned within the counter-flow manifolds 18, 20, and mono valves 30, 32 within the cylinder heads 34, 36 of the power cylinders 14, 16.

Figure 2:
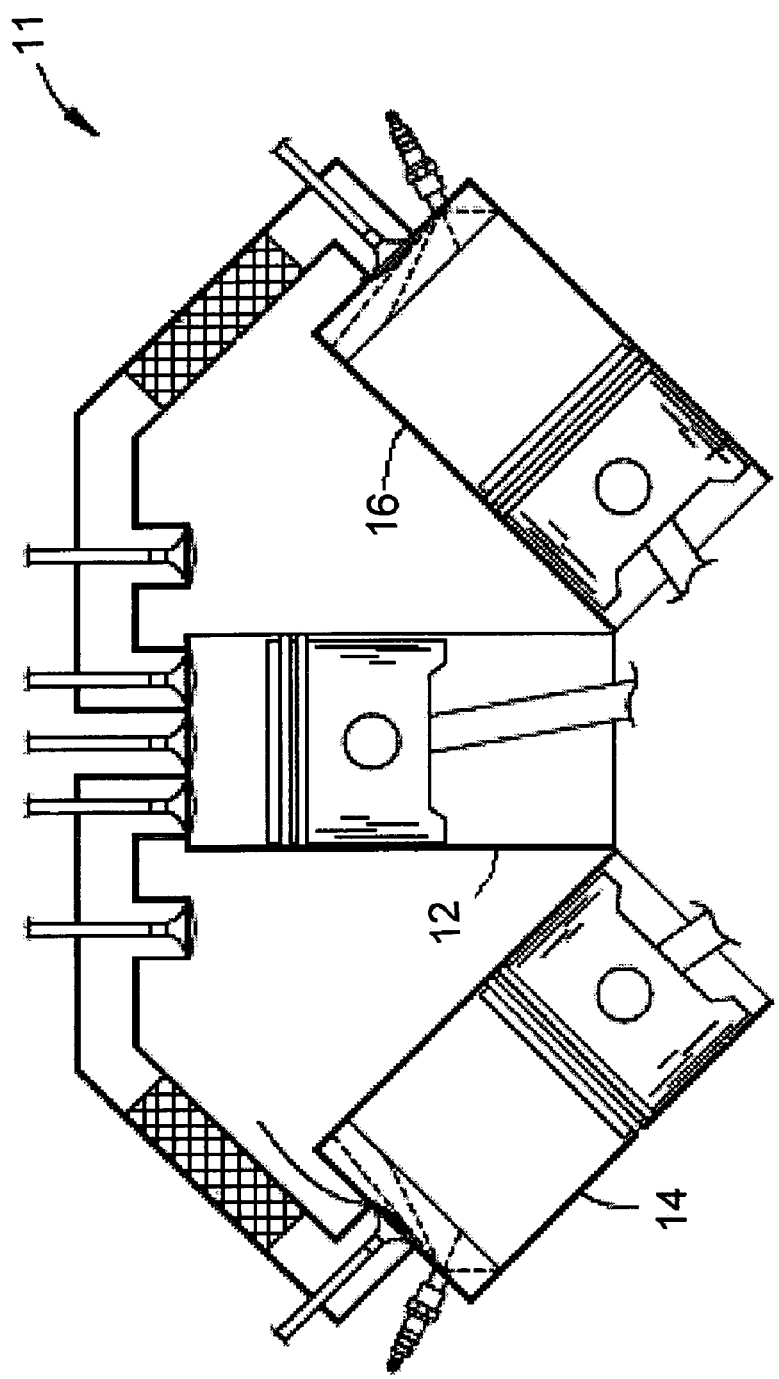
FIG. 2 is a sectional view of another thermal transfer engine of the present invention.

Another version of the thermal transfer engine 11, shown in FIG. 2, presents the power cylinders in the popular V type of engine design wherein the transfer cylinder 12 is added, vertically, between the slanted power cylinders 14, 16. Thus, for example, a six-cylinder engine would contain the usual six-power cylinders with three transfer cylinders being added vertically.

Each power cylinder 14, 16 has a power piston 38, 40 reciprocated therein by the crankshaft (not shown). Each power cylinder head 34, 36 has a fuel injector 42, 44, a spark plug (not shown) and a mono valve port 50, 52 for each mono valve 30, 32. The fuel injectors 42 and 44 directly inject fuel into the head of the power cylinder, just as in a diesel engine, thus eliminating the concern of premature fuel ignition. Operation of the engine 10 may be enhanced by the use of low octane fuels without ignition-retarding additives, reducing the cost of gasoline manufacture.

Since the hot exhaust gas and cold intake air share the counter-flow manifolds 18 and 20 during operation, there is no need for separate intake and exhaust valve ports in the power cylinder heads 34, 36. The mono valves 30 and 32 serve the purpose of both the intake and exhaust valves in a typical internal combustion engine. While the use of a mono valve in the cylinder head is known for two-stroke engines, the use of a single or mono valve 30, 32, in the cylinder head of a four-stroke engine is a departure from the norm.

Using a mono valve 30, 32 enhances the heat recovery process. Hot exhaust gases impart heat to the mono valves 30, 32 creating a "hot spot" in the power cylinder head 34, 36. The intake air, preheated by the regenerator 22, 24, then passes through this hot spot in the power cylinder head 34, 36 picking up additional valuable heat on the way into the power cylinder 14, 16. As the intake air picks up heat from the mono valve 30, 32, it has a cooling effect, prolonging life of the valves 30, 32. Another advantage in using a single valve in the power cylinder head 34, 36 is the mono valves 30, 32 may be located further away from the transfer valves 66, 68 of the transfer cylinder 12. This arrangement allows for longer counter-flow manifolds 18, 20, which in turn provide for longer regenerators 22, 24 and more heat recovery.

The transfer cylinder 12 has a transfer piston 54 reciprocated therein by the crankshaft. The transfer cylinder head 56 has an intake valve port 58 and intake valve 60, and two transfer valve ports 62, 64 with transfer valves 66, 68. The transfer cylinder 12 shown in FIG. 1 is of the same diameter and stroke as the power cylinders 14, 16 so that all of the cylinders have the same swept volume, as is common with current internal combustion engine design. The transfer cylinder 12 and its components do not experience significant pressure loads during operation and may be of lightweight fabrication, adding minimal weight to the overall weight of the engine 10.

Although the sequential operation of the engine 10 described below utilizes timing of the intake valve 60 and transfer valves 66, 68 to control the amount of intake air delivered to the power pistons 14, 16, other aspects of the engine 10 may be modified to control the amount of intake air transferred to the power pistons 14, 16. For example, the use of a shorter length transfer cylinder 12 with a reduced stroke to control the expansion ratio of the engine 10 is a viable option.

The counter-flow manifolds 18, 20 connect the transfer cylinder 12 in fluid communication to the power cylinders 14, 16 and positions the regenerators 22, 24 mid-way between the transfer cylinder 12 and each of the power cylinders 14, 16. The regenerators 22, 24 shown in FIG. 1 are illustrated as replaceable wire mesh packets with catalytic converter properties that also provides good noise suppression qualities. However, other types of similar regenerators known in the art may be used.

The regenerators 22, 24 are used as counter-flow heat exchangers to recover waste heat from exhaust gases created during combustion of the air-fuel mixture in the power cylinders 14, 16, and to impart the waste heat to cold intake air delivered by the transfer cylinder 12, resulting in high compression temperatures without increasing compression ratios. The temperature differential between the intake air being supplied to the power cylinders 14, 16 by the transfer cylinder 12 and the exhaust gases created during combustion of the air-fuel mixture in the power cylinder 14, 16 dictates how much heat may be absorbed by the regenerators 22, 24. The greater the difference in temperature between the intake air and the exhaust gas, the greater the potential for heat recovery. The high compression temperatures created in the power cylinders 14, 16 dictate that the fuel is preferably direct-injected into the power cylinder 14, 16, as is common practice in diesel engines.

The exhaust dump valves 26, 28 are seated in exhaust valve ports 70, 72 of the counter-flow manifolds 18, 20, positioned mid-way between the regenerators 22, 24 and the transfer valves 66, 68 of the transfer cylinder 12.

Preheating intake air before compression results in very high temperatures at the end of the compression stroke in the power cylinders 14, 16. The table shown in FIG. 3 illustrates the effect of heat recovery on compression temperatures and fuel draw per unit of intake air. The table shows the trend of higher compression temperature requiring less fuel consumption.

A typical four stroke internal combustion engine operates by first drawing the air-fuel mixture into the cylinder during the intake stroke, compressing the air-fuel mixture during the compression stroke, delivering power to the piston through combustion during the expansion stroke, and exhausting combustion gases from the cylinder during the exhaust stroke. Each of these four strokes consume 180 degrees of rotation of the crankshaft, moving through two revolutions of the crankshaft to complete one full power cycle of the engine. FIGS. 4–7 illustrate operation of an engine 10 of the present invention as the engine 10 move through one full power cycle. Although the power pistons 38 and 40 are illustrated in FIGS. 4–7 as being 180 degrees out of phase with the transfer piston 54, it is contemplated that the phase difference may be other than 180 degrees to facilitate delivering differing amounts of intake air to the power pistons 14, 16 during operation.

Figure 4:
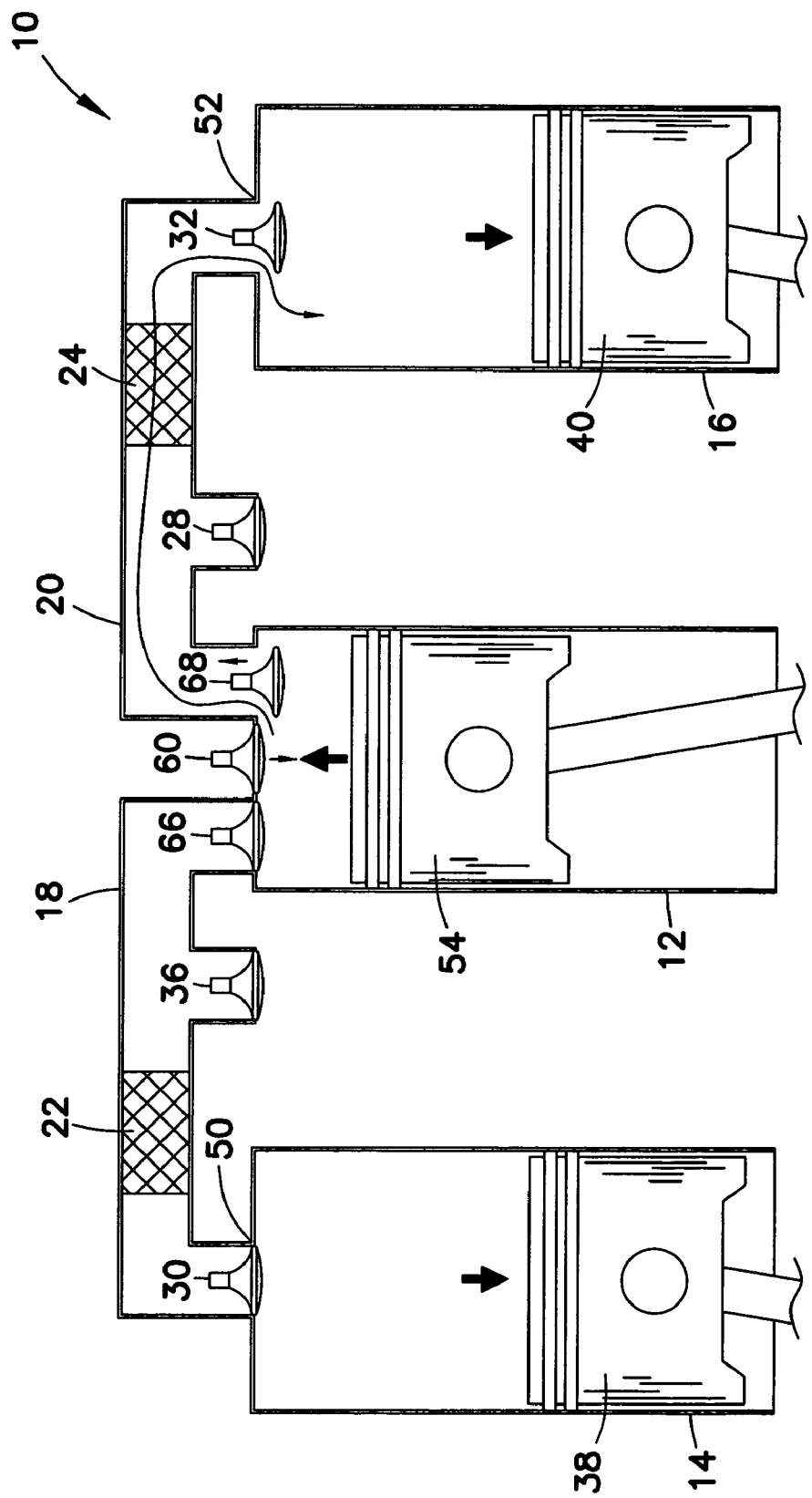
FIG. 4 illustrates movement of the valves and pistons of an engine of the present invention as the crankshaft rotates from 0 degrees to 180 degrees.

FIG. 4 illustrates movement of the valves and pistons of the engine 10 as the crankshaft rotates from 0 degrees to 180 degrees. During this portion of the engine cycle, the power pistons 38 and 40 move from top dead center to bottom dead center within the power cylinders 14 and 16, while transfer piston 54 moves from bottom dead center to top dead center within the transfer cylinder 12.

The first power piston 38 is in its expansion stroke as fuel, directly injected by fuel injector 42 (FIG. 1), is ignited by the sparkplug, pushing the first power piston 38 downward. Simultaneously, the transfer piston 54 pushes intake air from the transfer cylinder 12, through the open second transfer valve 68 and into the second counter-flow manifold 20, where the intake air is heated by the second regenerator 24 before entering the second power cylinder 16. The second mono valve 32 remains open from the previous exhaust stroke as the second power piston 40 reciprocates downwardly in its intake stroke, drawing pre-heated air from the second counter-flow manifold 20 into the second power cylinder 16. That is, the second mono valve 32 opens at bottom dead center of the exhaust stroke and remains open through 360 degrees revolution of the crankshaft during the exhaust and intake strokes before closing at bottom dead center of the intake stroke. The air entering the second power cylinder 16 absorbs additional heat from the second mono valve 32 that was heated by exhaust gases exiting the second power cylinder 16 from the previous exhaust stroke. The transfer cylinder 12 takes in intake air on each downward stroke of the transfer piston 54 and delivers intake air, uncompressed, on each upward stroke of the transfer piston 54, alternately, to the two power cylinders 14 and 16, by way of the counter-flow manifolds 18 and 20. This confined air supply is prevented from expanding as it is heated by the regenerator 22, 24, hot metal of the power cylinder head 34, 36, and the power cylinder's mono valve 30, 32. The heated air, being confined from expansion, generates pressure. This pressure is created without any substantial work in that no fuel was burned to create this pressure and no substantial negative work of compression was used to create this pressure.

When the transfer cylinder 12 has delivered a specified amount of pre-heated air to the second power cylinder 16, so as to create the desired expansion ratio, the second transfer valve 68 closes in the transfer cylinder head 56 (FIG. 1), cutting off further air transfer to the second power cylinder 16. For example, in an engine where the transfer cylinder 12 and power cylinders 14, 16 each have volume of 70.9 cubic inches, the second transfer valve 68 may close at 101.5 degrees after bottom dead center, delivering 40 cubic inches of air to the second power cylinder 16.

As the second transfer valve 68 closes, air intake valve 60 opens in the transfer cylinder head 56 to vent off any unused air from the transfer cylinder 12, avoiding any undesirable compression work in transfer cylinder 12. In the previously mentioned example, the intake valve 60 may open at 100 degrees before top dead center, and remain open until the transfer piston 54 reaches bottom dead center of the intake stroke. The second exhaust dump valve 28 is closed in the second counter-flow manifold 20 during this process.

Figure 5:
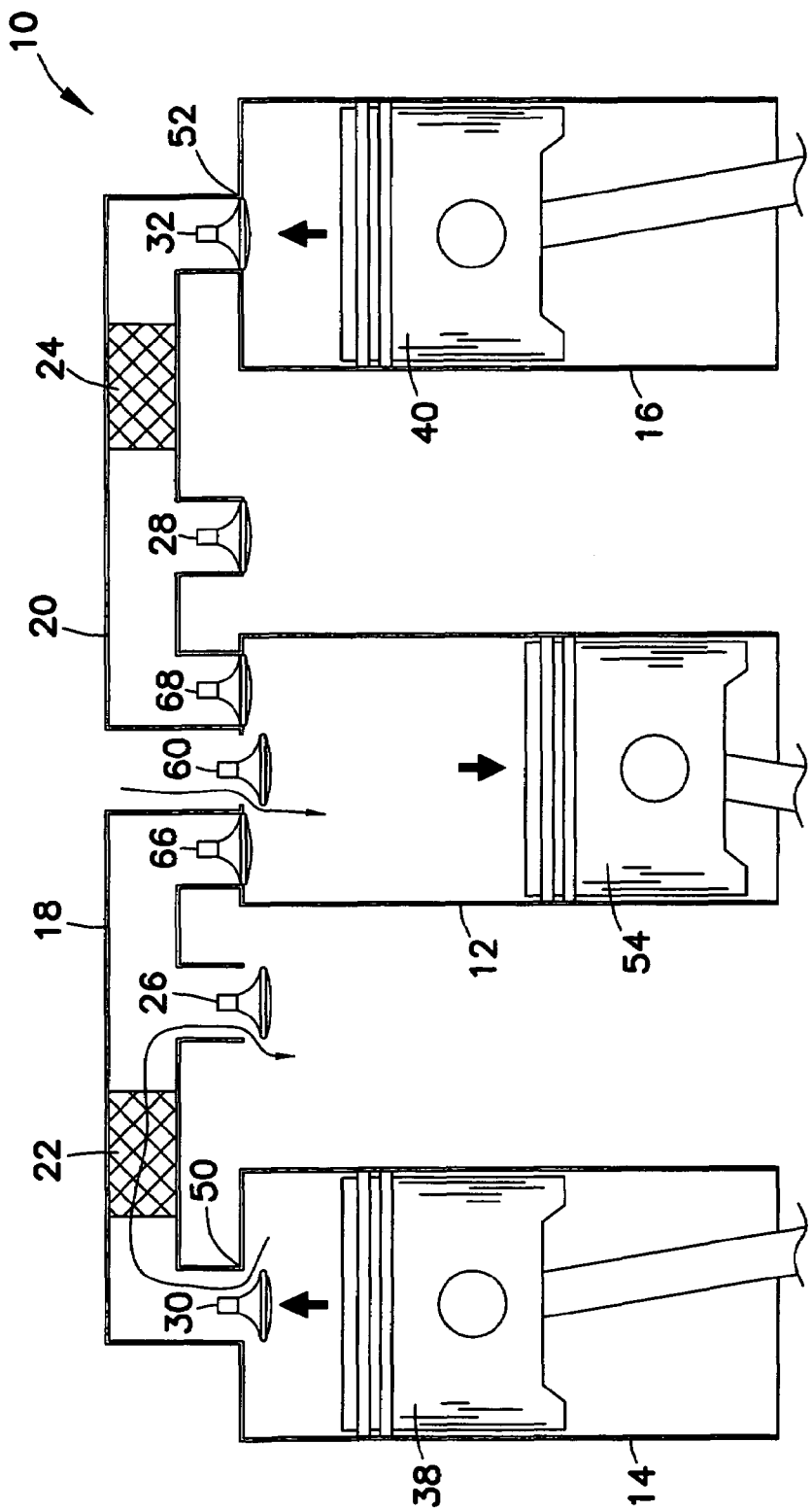
FIG. 5 illustrates movement of the valves and pistons of an engine of the present invention as the crankshaft rotates from 180 degrees to 360 degrees.

FIG. 5 illustrates movement of the valves and pistons of the engine 10 as the crankshaft rotates from 180 degrees to 360 degrees. During this portion of the engine cycle, the power pistons 38 and 40 move from bottom dead center to top dead center, while the transfer piston 54 moves from top dead center to bottom dead center.

The transfer piston 54 reciprocates downwardly within transfer cylinder 12, taking in a new supply of ambient temperature air through open intake valve 60. Simultaneously, the first power piston 38 reciprocates upwardly in its exhaust stroke, pushing hot exhaust gases from the first power cylinder 14, through the first open mono valve 30, and into the first counter-flow manifold 18. Heat from the exhaust gases are absorbed by the first regenerator 22 as the exhaust gas exits the engine 10 through open second exhaust valve 26. As the second power piston 40 simultaneously reciprocates upwardly in its compression stroke, the second mono valve 32 is closed in the second power cylinder head 36 (FIG. 1). As mentioned in the earlier example, the transfer cylinder 12 may deliver 40 cubic inches of air to the 70.9 cubic inch second power cylinder 16, reducing the amount of air-fuel mixture compressed during the compression stroke. Compressing a smaller amount of air-fuel mixture during the compression stroke reduces the compression ratio and amount of work necessary to achieve combustion and power delivery to the power piston during the expansion stroke.

Figure 6:
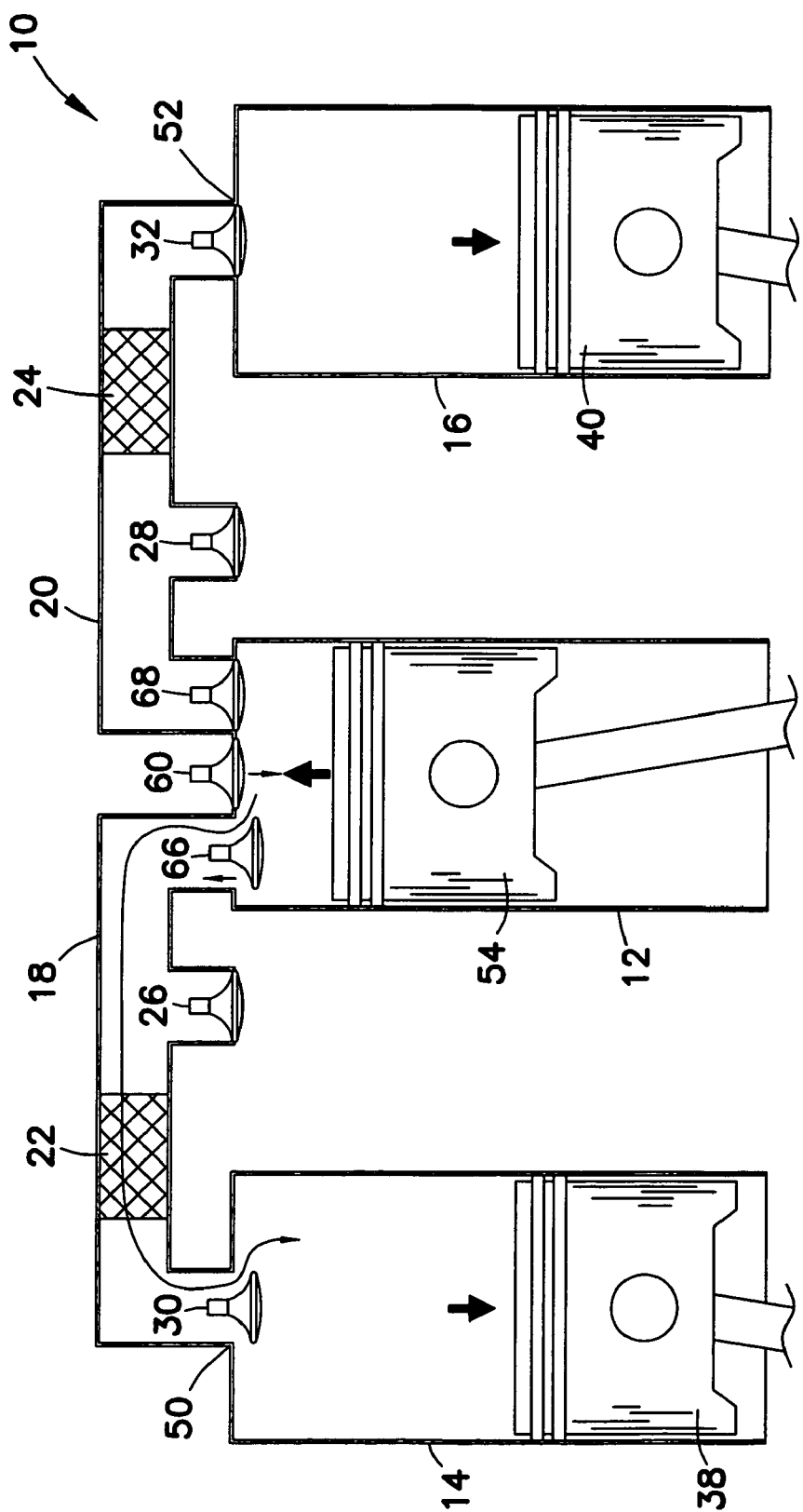
FIG. 6 illustrates movement of the valves and pistons of an engine of the present invention as the crankshaft rotates from 360 degrees to 540 degrees.

FIG. 6 illustrates movement of the valves and pistons of the engine 10 as the crankshaft rotates from 360 degrees to 540 degrees. During this portion of the engine cycle, power pistons 38 and 40 move from top dead center to bottom dead center, while transfer piston 14 moves from bottom dead center to top dead center.

As the transfer piston 54 reciprocates upwardly in its transfer stroke, it pushes intake air through the first counter-flow manifold 18, where the air is heated by the first regenerator 22, and into the first power cylinder 14 through the open first mono valve 30. The heat gathered by the air from the regenerator 22 and mono valve 30 reduces the amount of fuel need to burn to attain the desired compression temperature during the compression stroke. Once the air supply transferred from the transfer cylinder 12 to power cylinder 14 has attained the volume of air necessary to achieve the desired expansion ratio, the air supply is cut off by closing the first transfer valve 66 of transfer cylinder 12. As first transfer valve 66 closes, intake valve 60 opens to vent off the remaining air in transfer cylinder 12. Second fuel injector 44 (FIG. 1) injects fuel into the second power cylinder head 36, just prior to top dead center of the second power piston 40 in the second power cylinder 16. Combustion of the fuel is assured as the sparkplug initiates the combustion process. The second power piston 40 then proceeds downward in the second power cylinder 16 in response to combustion of the smaller air-fuel mixture where it is allowed to travel through the entire stroke length of the power cylinder, providing an expansion ratio that is larger than the compression ratio.

Figure 7:
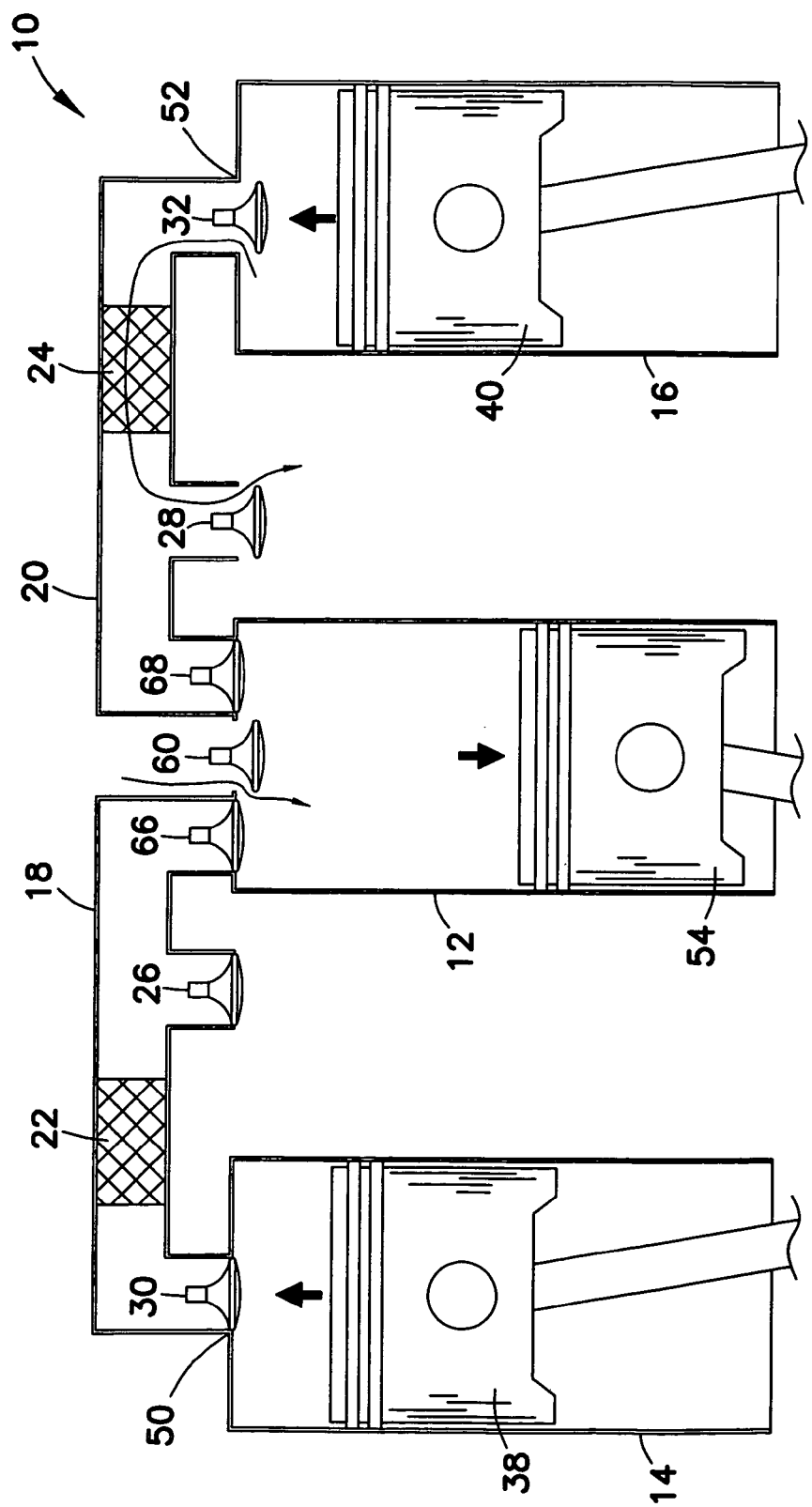
FIG. 7 illustrates movement of the valves and pistons of an engine of the present invention as the crankshaft rotates from 540 degrees to 720 degrees.

FIG. 7 illustrates movement of the valves and pistons of the engine 10 as the crankshaft rotates from 540 degrees to 720 degrees. During this portion of the engine cycle, power pistons 38 and 40 move from bottom dead center to top dead center, while transfer piston 54 moves from top dead center to bottom dead center.

As the first power piston 38 reciprocates upwardly in its compression stroke with the first mono valve 30 closed, the transfer cylinder 12 is taking in a fresh supply of intake air through open intake valve 60. Simultaneously, the second power cylinder 16 reciprocates upwardly in its exhaust stroke, pushing exhaust gas through open second mono valve 32 and through second regenerator 24 into second counter-flow manifold 20. The exhaust leaves its heat on second regenerator 24 on its way through open second exhaust dump valve 28 where it departs the engine 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A thermal transfer internal combustion engine, comprising:
   a transfer cylinder having a transfer piston reciprocating therein;
   an intake valve in said transfer cylinder;
   a manifold connected in fluid communication with said transfer cylinder;
   a power cylinder having a power piston reciprocating therein;
   a mono valve port positioned in said power cylinder, connecting said power cylinder and said manifold in fluid communication; and
   a regenerator within said manifold between said transfer valve and said mono valve port for heating intake air entering said power cylinder,
   wherein transferred intake air entering said power cylinder, and exhaust gases exiting said power cylinder both flow through said mono valve port.

2. The engine of claim 1, wherein said transfer piston reciprocates out of phase with said power piston.

3. The engine of claim 1, further comprising:
   a second power cylinder having a second power piston reciprocating therein, connected in fluid communication with said manifold.

4. The engine of claim 3, wherein said transfer piston reciprocates out of phase with said power piston and said second power piston, alternately feeding intake air to said power cylinder and said second power cylinder during each upward stroke of said transfer piston.

5. The engine of claim 1, further comprising a transfer valve in said transfer cylinder that opens and closes only during each intake stroke of said power piston to deliver a single unit of transferred intake air, having less volume than the volume of said power cylinder, to said power cylinder.

6. The engine of claim 1, further comprising a mono valve movable within said mono valve port, said mono valve being heated by exhaust gases exiting through said mono valve port and imparting said heat to transferred intake air entering through said mono valve port.

7. A thermal transfer internal combustion engine, comprising:
   a pair of four stroke cycle power cylinders;
   a transfer cylinder having a transfer piston reciprocating therein, delivering a single unit of uncompressed intake air during each upward stroke;
   a manifold alternately delivering to each of said power cylinders successive single units of uncompressed intake air from said transfer cylinder; and
   a regenerator within said manifold, absorbing heat from exhaust gas exiting said power cylinders and imparting heat to said single units of uncompressed intake air prior to entering said power cylinders.

8. The engine of claim 7, further comprising an exhaust valve within said manifold positioned between said transfer cylinder and said regenerator, closed during each upward stroke of said transfer piston.

9. The engine of claim 7, further comprising:
   an intake valve in said transfer cylinder for intaking intake air into said transfer cylinder; and
   a transfer valve in said transfer cylinder that opens and closes only during each intake stroke of one of said pair of four stroke cycle power cylinders to deliver said single unit of uncompressed intake air, having less volume than the volume of said power cylinder, to said manifold.

10. The engine of claim 9, wherein intake air is temporarily held in said manifold prior to entrance into said pair of four stroke cycle power cylinders.

11. The engine of claim 7, wherein each of said pair of four stroke cycle power cylinders further comprises a mono valve port positioned in said power cylinder,
    wherein said units of uncompressed intake air entering said power cylinder, and exhaust gases exiting said power cylinder both flow through said mono valve port.

12. A thermal transfer internal combustion engine, comprising:
    a power cylinder having a power piston reciprocating therein;
    a transfer cylinder in fluid communication with said power cylinder, said transfer cylinder having a transfer piston reciprocating therein out of phase with said power piston;
    an intake valve in said transfer cylinder for intaking intake air into said transfer cylinder;
    a transfer valve in said transfer cylinder that delivers the intake air to said power cylinder during each intake stoke of said power piston, and closes, upon delivering a unit of intake air having less volume than said power cylinder, until said power piston's next intake stroke; and
    a regenerator positioned between said power cylinder and said transfer cylinder, absorbing heat from exhaust gas exiting said power cylinder and imparting heat to said unit of intake air entering said power cylinder.

13. The engine of claim 12, further comprising a second power cylinder in fluid communication with said transfer cylinder, said transfer cylinder alternately feeding said units of intake air to each of said power cylinder and said second power cylinder on each upward stroke of said transfer piston.

14. The engine of claim 13, wherein said power cylinder and said second power cylinder each further comprise a mono valve port positioned therein, wherein said unit of intake air entering each of said power cylinders, and exhaust gases exiting each of said power cylinders both flow through said mono valve port.

15. The engine of claim 12, wherein said transfer piston reciprocates out of phase with said power piston.

16. A method of reducing fuel consumption in a four stroke cycle thermal transfer internal combustion engine having a manifold, with a regenerator therein, in fluid communication with a transfer cylinder, having a reciprocating transfer piston therein, and a first power cylinder, with a first reciprocating power piston therein, comprising:
    drawing a first unit of air having less volume than the power cylinder into the transfer cylinder;
    pushing said first unit of air into the manifold with a first upward stroke of the transfer piston;
    preheating said first unit of air with heat from the regenerator to a temperature that assists in obtaining combustion in the power cylinder with a reduced amount of fuel;
    drawing said first unit of air into the first power cylinder during the intake stroke of the first power piston substantially coinciding with the first upward stroke of the transfer piston;

drawing a second unit of air into the transfer cylinder;

pushing said second unit of air into the manifold with the next upward stroke of the transfer piston immediately succeeding the first upward stroke of the transfer piston;

providing a second power cylinder in fluid communication with said manifold; and drawing said second unit of air into said second power cylinder during the intake stroke of said second power piston substantially coinciding with the next upward stroke of the transfer piston immediately succeeding the first upward stroke of the transfer piston.

17. The method of claim 16, further comprising preheating said second unit of air with heat from the regenerator to a temperature that assists in obtaining combustion in the power cylinders with a reduced amount of fuel.

18. The method of claim 17, further comprising heating the regenerator with heat from exhaust gases exiting the power cylinder.

* * * * *